(12) United States Patent
Abro et al.

(10) Patent No.: US 8,888,159 B2
(45) Date of Patent: Nov. 18, 2014

(54) CONSOLE ASSEMBLY WITH VISIBLE GUIDE

(75) Inventors: Lauren M. Abro, Farmington Hills, MI (US); Hisamitsu Tatsunami, Toyota Aichi (JP); Hiroshi Kato, Northville, MI (US)

(73) Assignees: Toyota Motor Engineering & Manufacturing North America, Inc., Erlanger, KY (US); Toyoda Gosei North America Corporation, Troy, MI (US)

( * ) Notice: Subject to any disclaimer, the term of this patent is extended or adjusted under 35 U.S.C. 154(b) by 3 days.

(21) Appl. No.: 13/435,102

(22) Filed: Mar. 30, 2012

(65) Prior Publication Data

US 2013/0257076 A1 Oct. 3, 2013

(51) Int. Cl.
*B60R 7/04* (2006.01)

(52) U.S. Cl.
USPC ............ 296/24.34; 296/24.46; 29/464

(58) Field of Classification Search
USPC ............. 296/24.3, 24.46, 24.34; 29/464
See application file for complete search history.

(56) References Cited

U.S. PATENT DOCUMENTS

| 7,566,040 | B2 * | 7/2009 | Lota .......................... 248/311.2 |
| 7,789,238 | B2 * | 9/2010 | Claypool et al. ............. 206/508 |
| 2009/0179448 | A1 * | 7/2009 | Lota et al. ................... 296/24.34 |

FOREIGN PATENT DOCUMENTS

| JP | 2000071885 A | * | 3/2000 |
| JP | 2004175136 A | * | 6/2004 |

* cited by examiner

*Primary Examiner* — Glenn Dayoan
*Assistant Examiner* — Melissa A Black
(74) *Attorney, Agent, or Firm* — Gifford, Krass, Sprinkle, Anderson & Citkowski, P.C.

(57) ABSTRACT

A console assembly having a visual guide that affords for an individual to visually, and with an unobstructed line-of-sight, attach a back console body to a front console body is provided. The console assembly can include a front console body and a back console body, the two console bodies having a slot and hook combination that provides for a visible guide to an individual that is putting together or assembling the console.

14 Claims, 2 Drawing Sheets

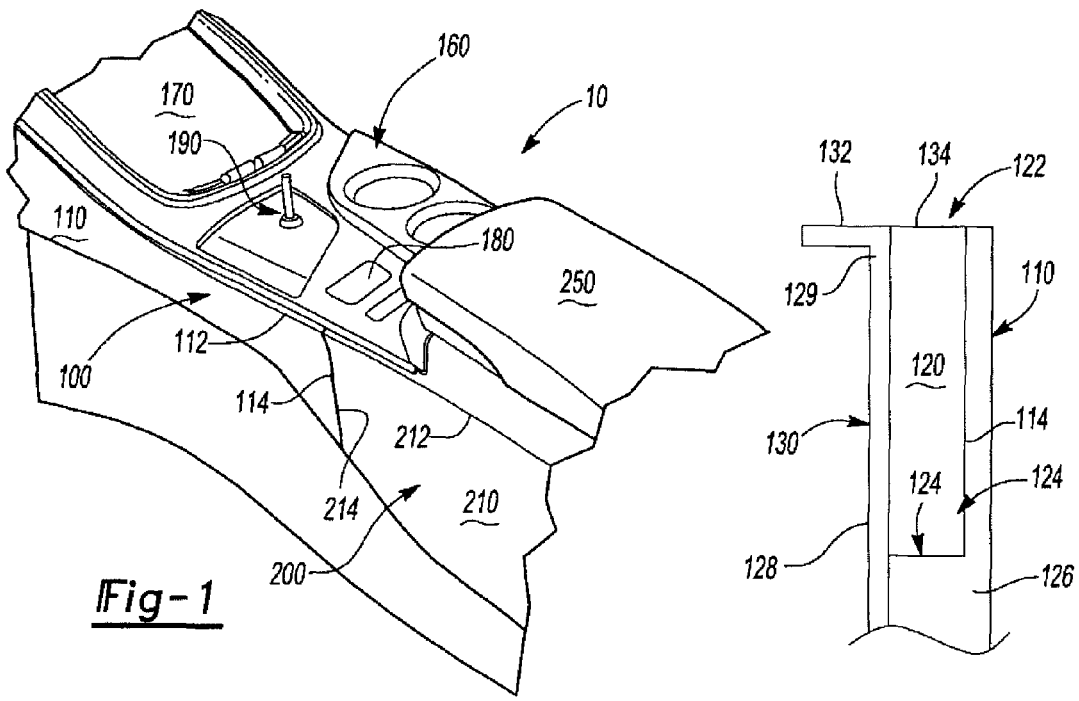
*Fig-1*
*Fig-3*
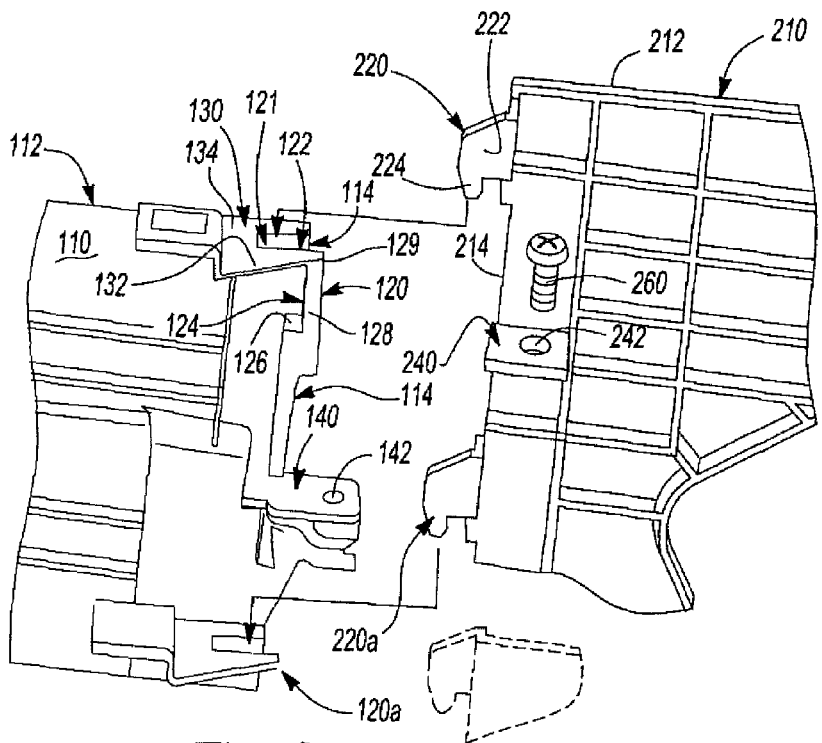
*Fig-2*

CONSOLE ASSEMBLY WITH VISIBLE GUIDE

FIELD OF THE INVENTION

The present invention is related to a console assembly, and in particular, to a console assembly having a front console body and a back console body with a visible guide to aid in attaching the back console body to the front console body.

BACKGROUND OF THE INVENTION

The use of consoles in a variety of machines is known. For example, it is known to have a center console within a motor vehicle between a driver's seat and a front passenger seat. In addition, it is also known to have center consoles between additional passenger seats within a motor vehicle.

In some instances, a center console can be made from two or more components such as a front console body and a back console body. During assembly of the center console, the front or back console body can be placed in the motor vehicle first with the back console or front console body, respectively, then attached thereto. It is appreciated that assembly of such consoles can occur within an assembly line manufacturing facility and thus assembly of the console must be performed in a time efficient and quality manner.

However, heretofore console assemblies have required a "blind" operation when attaching, e.g., a back console to a front console body. In particular, the back console has been attached to the front console with fastener attachments located within an inner portion of each console body and the fastener attachments have not been visible by an assembly line worker during the assembly or attachment process. As such, the assembly line worker must rely upon experience and "feel" in order to properly attach the two console bodies together. Therefore, a console assembly that afforded for a visible guide to align and attach the front console body to the back console body, or vice versa, would be desirable.

SUMMARY OF THE INVENTION

A console assembly is provided. The console assembly can have a front console body that has a front side wall with a top edge portion and a back edge portion. The front side wall can also have a slot oriented in a generally vertical direction with an open top end and the slot can be located proximate to the top edge portion and the back edge portion, e.g. at a rear upper corner of the front console body. The slot can have a closed bottom end bounded by a bottom ledge and one side of the slot can be bounded by a generally vertical flange while the other side of the slot can be bounded by the back edge portion of the front side wall.

The bottom ledge can be attached to and extend between the generally vertical flange and the front side wall. In addition, the open top end of the slot can be bounded on one side by the generally vertical flange and bounded on the other side by the top edge portion of the front side wall. In this manner, a slot is provided at a top rearward location of the front side wall and can be clearly viewed by an assembly line worker.

The console assembly can also include a back console body that has a back side wall with a hook. The hook can have a first leg oriented in a generally horizontal direction and a second leg end extending from the first leg in a generally vertical direction. The first leg extends in a forward direction towards the front console body and may or may not extend beyond a front edge portion of the back side wall. In addition, the hook can be located within the slot and the hook second leg engaged with the bottom ledge of the slot when the back console body is attached to the front console body. It is appreciated that the hook can be located at an upper forward region of the back side wall and is complementary and aligned with the slot such that placement of the hook within the slot can result in a proper and desired attachment of the back console body to the front console body. In addition, with the hook located in a forward and upward region of the back side wall, the hook is also visible from above by an assembly line worker that is assembling a motor vehicle and attaching the back console body to the front console body. As such, the front console body with the slot and the back console body with the hook both oriented and located at a clearly visible location by an assembly line worker provides a visible guide for assembly of the console.

The console assembly and/or the front side wall can further include a bracket that has the generally vertical flange and the bottom ledge and the bracket is attached to the front side wall. In some instances, the bracket can have a generally horizontal flange extending from a top end of the generally vertical flange, the generally horizontal flange bounding the open top end of the slot. In addition, the bracket may or may not include an upper ledge that is attached to and extends between the generally horizontal flange and the top edge portion of the front side wall, and the upper ledge can bound a front end of the open top end of the slot.

A process for installing a console assembly is also disclosed, the process including providing the front console body and the second console body described above. After the two console bodies have been provided, one of the console bodies, e.g. the front console body, can be placed within a motor vehicle being assembled and possibly attached to a floor of the motor vehicle. After the front console body has been placed within the motor vehicle, the back console body is aligned behind and in-line with the front console body. With the visual guide of the slot and the hook described above, an assembly line worker can visually, and with an unobstructed line-of-sight, slide the hook of the back console body into the slot of the front console body and engage the second leg of the hook with the closed bottom end of the slot. It is appreciated that the front console body and the back console body are dimensioned such that when the hook is located within the slot and the second leg of the hook is engaged with the closed bottom end of the slot, the two console bodies are oriented in a desirable configuration to each other.

BRIEF DESCRIPTION OF THE DRAWINGS

FIG. 1 is a perspective view of a console assembly according to an embodiment of the present invention;

FIG. 2 is a perspective view of a front side wall for a front console body and a back side wall for a back console body according to an embodiment of the present invention;

FIG. 3 is an end view of the front side wall shown in FIG. 2;

DETAILED DESCRIPTION OF THE PRESENT INVENTION

Figure 4:
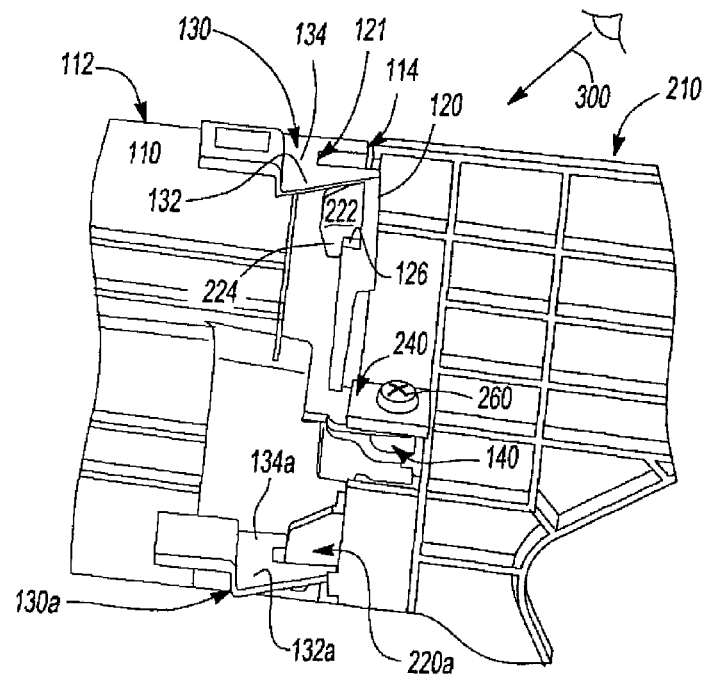
FIG. 4 is a perspective view of the front side wall and the back side wall shown in FIG. 2 with the back side wall attached to the front side wall according to an embodiment of the present invention.

A console assembly having a visual guide that affords for an individual to visually, and with an unobstructed line-ofsight, attach a back console body to a front console body is provided. As such, the console assembly has utility as a component for a motor vehicle.

The console assembly can include a front console body and a back console body, the two console bodies having a slot and hook combination that provides for a visible guide to an individual that is putting together or assembling the console. In some instances, the front console body has a front side wall with a slot located at an upper rear corner of the console wall. By being located in the upper and rear corner of the console body, an individual that is assembling the console has clear and unobstructed view of the slot. In addition, the hook can be located at an upper front corner of the back console body and thus a clear and unobstructed view of the hook is also provided to the individual assembling the console. As such, when the individual attempts to attach the back console body to the front console body, the clearly visible slot and hook provide a visual guide for the assembly thereof. It is appreciated that the slot and the hook are located such that placement of the hook within the slot results in an accurate and desired alignment and attachment of the back console body to the front console body.

Turning now to FIG. 1, a console assembly is shown generally at reference numeral 10. The console 10 can have more than one component, e.g. a front console body 100 and a back console body 200. The front console body can have a side wall 110, the side wall 110 having an upper edge portion 112 and a back edge portion 114. Likewise, the back console body 200 can have a side wall 210 with an upper edge portion 212 and a front edge portion 214. It is appreciated that the console 10 can be a center console within a motor vehicle and as such have additional features such as a cup holder 160, a tray 170, a device 180, a transmission gear selector 190, and the like. It is also known that such center consoles can have an armrest 250 which may or may not have a storage compartment underneath.

Turning now to FIGS. 2 and 3, FIG. 2 provides a perspective view of an inner side of the front side wall 110 and the back side wall 210 and FIG. 3 provides an end view of the front side wall 110. The front side wall 110 can have a slot 120 that affords for a hook 220 of the back side wall to enter and fit therewithin. The slot 120 can have an open top end 122 and a closed bottom end 124. The closed bottom end 124 can be bounded by a bottom ledge 126. In addition, the slot 120 can be bounded on one side by a generally vertical flange 128 and on another side by the front side wall 110. In this manner, a generally vertical slot 120 is provided, the slot 120 having an open top end 122.

In some instances, the slot 120 can be part of a bracket 130, the bracket 130 having or containing the generally vertical flange 128 and a generally horizontal flange 132. It is appreciated that the generally horizontal flange extends from an upper end 129 of the generally vertical flange 128. In addition, the bracket 130 can have an upper ledge 134 that extends between the generally horizontal flange 132 and the front side wall 110. As such, the open top end 122 of the slot 120 can have a front end 121 that is bounded by the upper ledge 134.

The hook 220 of the back side wall 210 can be located proximate to the top edge portion 212 and front edge portion 214. In addition, the hook 220 can have a first leg 222 that is oriented in a generally horizontal direction when the back console body 200 is attached to the front console body 100, and a second leg 224 that extends from the first leg 222 in a generally vertical direction. The back side wall 210 can also include a similar or identical hook 220a located further down the front edge portion 214, the second hook 220a provided to fit within an additional slot 120a that can be part of the front side wall 110. Furthermore, a tab 240 with an aperture 242 can be provided with the back side wall 210, the tab 240 being aligned with a tab 140 and aperture 142 of the front side wall 110. Furthermore, once the hook 220 is located within the slot 120 and the second leg 224 engages the bottom ledge 126, a threaded fastener 260 can be placed through the aperture 242 and used to further attach the back side wall 210 to the front side wall 110 as shown in FIG. 4.

Figure 5:
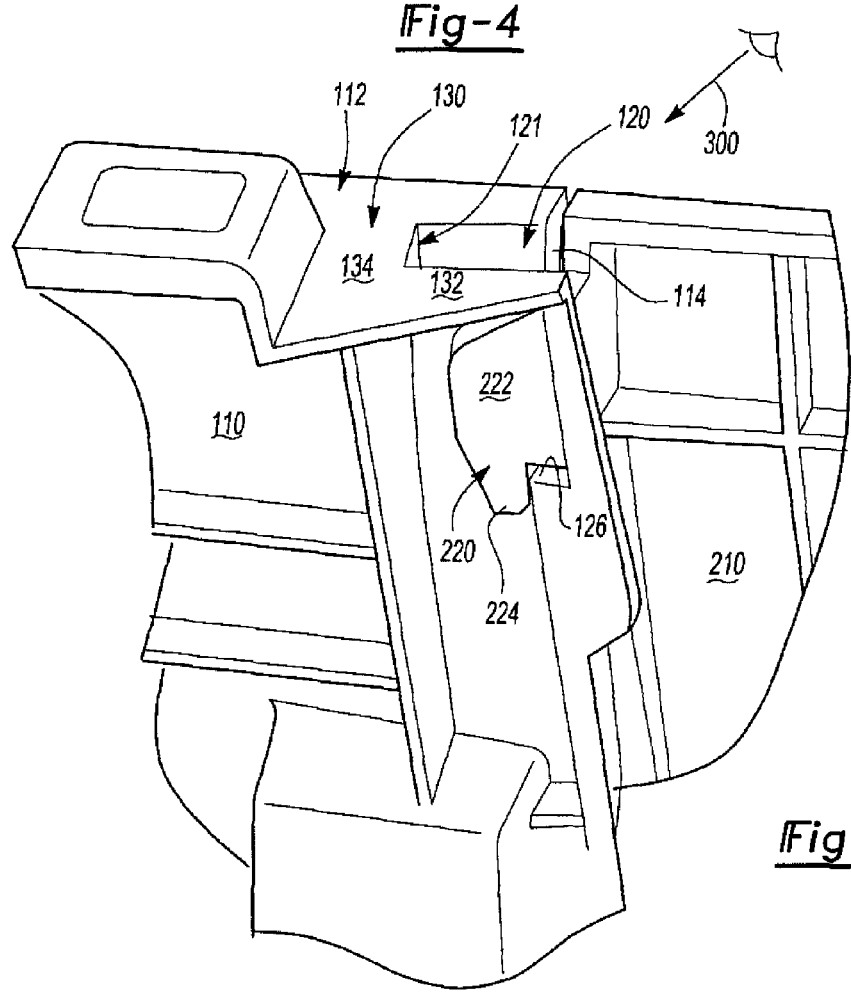
FIG. 5 is an enlarged view of a slot and hook according to an embodiment of the present invention.

FIG. 5 provides an enlarged view of the hook 220 within the slot 120 and the second leg 224 engaged with the bottom ledge 126. It is appreciated that a width of the slot 120 allows for the hook 220 to slide therein and with the hook 220 within the slot 120, the back side wall 210 is aligned with the front side wall 110. Likewise, the back console body 200 is aligned with the front console body 100.

A process for assembling the console 10 can include providing the front console body 100 and placing the console body 100 in a desired location. Thereafter, an individual can grasp the back console body 200 and visually with an unobstructed line-of-sight as shown by arrow 300 as shown in FIGS. 4 and 5, slide the hook 220 into the slot 120 in a frontward-downward direction until the hook 220 engages the bottom end 124 of the slot 120. Thereafter, the threaded fastener 260 can be placed through the aperture 242 and at least partially within the aperture 142 in order to provide an additional attachment securement of the back console body 200 to the front console body 100. It is appreciated that the front console body 100 can be placed within a motor vehicle being assembled within an assembly line manufacturing facility, with the front console body 100 possibly attached to a floor of the motor vehicle. In some instances, the front console body 100 can be temporarily attached to the floor, or in the alternative, securely or permanently attached to the floor. Thereafter, an assembly line worker can grasp the back console body 200 and align the back console body 200 behind and in line with the front console body 100. In addition, the assembly line worker can visually, and with an unobstructed line-of-sight, slide the hook 220 of the back console body into the slot 120 of the front console body and engage the second leg 224 with the closed bottom end 124 and/or bottom ledge 126 of the slot 120. As such, the slot 120 and hook 220 provide a visual guide for the assembly of the console 10.

Given the above disclosure of the console assembly, it is appreciated that modifications, changes, alterations, and the like will be evident to one skilled in the art and yet not fall outside of the scope of the invention. In addition, it is appreciated that the front console body and the back console body can be made from any material known to those skilled in the art, illustratively including polymers, metals, alloys, ceramics, wood, and the like. As such, the description above should not be read to limit the scope of the invention as it is the following claims which define the scope.

We claim:

1. A console assembly comprising:
 a front console body having a front side wall with a top edge portion and a back edge portion;
 a bracket attached to said front side wall, said bracket having a generally vertical flange and a bottom ledge;
 said front side wall also having a slot oriented in a generally vertical direction with an open top end, a closed bottom end bounded by said bracket bottom ledge and one side bounded by bracket generally vertical flange and another side bounded by said back edge portion, said open top end bounded on one side by said generally vertical flange and bounded on another side by said top edge portion;

a back console body having a back side wall, said back side wall having a hook with a first leg oriented in a generally horizontal direction and a second leg extending from said first leg in a generally vertical direction;

said hook located within said slot and said second leg engaged with said bottom ledge when said back console body is attached to said front console body;

wherein said slot and said hook are located such that there is an unobstructed line-of-sight between said slot and an individual looking down on said front console body and said back console body during assembly thereof.

2. The console assembly of claim 1, wherein said bottom ledge is attached to and extends between said generally vertical flange and said back edge portion of said front side wall.

3. The console assembly of claim 2, wherein said bracket has a generally horizontal flange extending from a top end of said generally vertical flange, said generally horizontal flange bounding said open top end.

4. The console assembly of claim 3, further comprising an upper ledge attached to and extending between said generally horizontal flange and said top edge portion of said front side wall.

5. The console assembly of claim 4, wherein said open top end has a front end bounded by said upper ledge.

6. A console assembly for a motor vehicle comprising:

a front console body having a pair of front side walls, each of said front side walls having a top edge portion and a back edge portion, each of said front side walls also having a bracket attached thereto, said bracket having a generally vertical flange spaced apart from said back edge portion and a bottom ledge attached to and extending between said generally vertical flange and said back edge portion, said generally vertical flange and said bottom ledge providing a slot with a closed bottom end and an open top end, each of said brackets also having a generally horizontal flange extending from a top end of said generally vertical flange, said generally horizontal flange bounding said open top end of said slot;

a back console body having a pair of back side walls, each of said back side walls having a hook with a first leg that is oriented in a generally horizontal direction and a second leg extending from said first leg in a generally vertical direction;

each of said hooks located within one of said slots and each of said second legs engaged with one of said bottom ledges when said back console body is attached to said front console body;

wherein said pair of slots and said pair of hooks are located such that there is an unobstructed line-of-sight between said pair of slots and an individual looking down on said front console body and said back console body during assembly thereof.

7. The console assembly of claim 6, wherein each of said brackets has an upper ledge attached to and extending between said generally horizontal flange and said top edge portion of one of said front side walls.

8. The console assembly of claim 7, wherein said open top end has a front end bounded by said upper ledge.

9. A process for installing a console assembly in a motor vehicle, the process comprising:

providing a front console body having a front side wall with a top edge portion and a back edge portion, the front side wall also having a slot oriented in a generally vertical direction and having a closed bottom end, an open top end and a pair of sides bounded by a generally vertical flange and the back edge portion, the closed bottom end bounded by a bottom ledge and the open top end bounded by the top edge portion on one side and the generally vertical flange spaced apart from the top edge portion on another side, the generally vertical flange and the bottom ledge being part of a bracket, the bracket attached to the front side wall and the slot being located between a portion of the bracket and the front side wall;

providing a back console body having a back side wall with an upper edge portion, the back side wall having a hook proximate to the upper edge portion, the hook having a first leg oriented in a generally horizontal direction and a second leg extending from the first leg in a generally vertical direction;

aligning the back console body behind and in-line with the front console body; and visually, and with an unobstructed line-of-sight, sliding the hook of the back console body into the slot of the front console body and engaging the second leg of the hook with the closed bottom end of the slot.

10. The process of claim 9, wherein the bracket has a generally horizontal flange extending from a top end of the generally vertical flange and spaced apart from the top edge portion of the front side wall.

11. The process of claim 10, wherein the bracket has an upper ledge spaced apart from the back edge portion of the front side wall, the upper ledge attached to and extending between the generally horizontal flange and the top edge portion of the front side wall.

12. The process of claim 11, wherein the open top end of the slot has a front portion bounded by the upper ledge.

13. The process of claim 12, further including attaching the back console body to the front console body with a threaded fastener.

14. The process of claim 13, further including:

providing an assembly line for assembly of motor vehicles;

providing a motor vehicle body being assembled on the assembly line;

placing the front console body in a passenger compartment of the motor vehicle;

placing the back console body in the passenger compartment of the motor vehicle;

aligning the back console body behind and in-line with the front console body; and visually, and with an unobstructed line-of-sight, sliding the hook of the back console body into the slot of the front console body and engaging the second leg of the hook with the closed bottom end of the slot.

\* \* \* \* \*